United States Patent Office 3,769,369
Patented Oct. 30, 1973

3,769,369
MIXTURES OF POLYISOPRENE RUBBER
AND POLYPENTENAMER
Wilhelm Graulich, Opladen, Manfred Beck, Odenthal-Globusch, Gunter Marwede, Leverkusen, and Dieter Theisen, Remscheid, Germany, assignors to Bayer Aktiengesellschaft, Leverkusen, Germany
No Drawing. Filed May 10, 1972, Ser. No. 252,027
Claims priority, application Germany, May 12, 1971,
P 21 23 452.6
Int. Cl. C08d 9/08
U.S. Cl. 260—887          6 Claims

ABSTRACT OF THE DISCLOSURE

Rubber mixtures containing (a) 5–95% by weight of polyisoprene rubber and
(b) 95–5% by weight of trans-1,5-polypentenamer.

---

This invention relates to mixtures of 5 to 95% by weight of polyisoprene rubber and 95 to 5% of polypentenamer.

Preferred mixtures consist of 50 to 95% by weight of polyisoprene and 50 to 5% by weight of polypentenamer.

Polyisoprene rubbers within the meaning of this invention are polymers of isoprene (2-methyl-butadiene-(1,3)) which have rubber-like properties.

Especially suitable are those polyisoprenes in which more than 70% of the double bonds and, in particular more than 85% are in the cis-configuration and in which the linkages are predominantly 1,4-linkages, e.g. at least 80% of the monomer units are linked in this way.

Polyisoprenes of this kind are known compounds and are already produced on a large scale. They have been generally described, for example, in "Polymer Chemistry of Synthetic Elastomers," Part II, edited by J. P. Kennedy and E. Tornquist Interscience Publishers, New York, 1969, pages 633 and 643 or in "Polyisoprene Elastomers" by D. Oosterhof, which appeared in Chemical Economics Handbook of the Stanford Research Institute, Menlo Park, Calif., 1969 or P. Schneider "Stereo-Polyisoprene," Ullmanns Ecyklopädie der technischen Chemie, 3rd Edition, pages 369—372, publishers Urban and Schwarzenberg, Munich, 1970.

Cis-1,4-polyisoprenes are very similar to natural rubber and have certain advantages, e.g. high elasticity and high abrasion resistance so that they are used in making automobile tires and technical rubber articles.

Compared with natural rubber, cis-1,4-polyisoprenes have a lower green strength and building tack. Both natural rubber and polyisoprenes have not much stability to reversion and to ageing on account of their chemical constitution. They can only be extended with small quantities of plasticiser oils.

Cis-1,4-polyisoprenes used in this invention can be made by art recognised methods, e.g. by polymerising isoprene with Li-alkyl or with organometallic catalysts of the Ziegler-Natta type, e.g. according to Belgian Pat. No. 726,447.

It is an object of this invention to improve the physical properties of cis-1,4-polyisoprene, i.e. its green strength, building tack, oil-extendability and stability to ageing and degradation. It was found that these properties are decisively improved by mixing polyisoprene and trans-1,5-polypentenamer.

Trans-1,5-polypentenamer is prepared, i.a. by ring opening polymerisation of cyclopentene with organometallic catalysts according to art recognised processes, e.g. according to German Pat. No. 1,299,868. The product is well known in the art. For this invention polypentenamers with rubber-like properties having at least 30% of their double bonds in trans-configuration are preferred. The trans double-bonds can form blocks or may be statistically distributed.

Mixtures of cis-1,4-polyisoprene and trans-1,5-polypentenamer are prepared either from the solid rubbers on conventional rubber processing machines or by blending rubber solutions in organic solvents and isolating the rubbers by removing the solvent. The mixtures have a much higher green strength and building tack than was expected from the arithmetic mean of the individual rubbers.

The degradation and ageing stability of cis-1,4-polyisoprene is also improved to a greater extent by the addition of trans-1,5-polyisoprene than is commensurate with the proportion of trans-1,5-polyisoprene added. Furthermore, the mixtures can be extended with a larger amount of extender oils than is normally tolerated by cis-1,4-polyisoprene without deleterious effect.

The mixtures according to the invention of cis-1,4-polyisoprene and trans-1,5-polypentenamer contain 5 to 95% by weight of polyisoprene and 95 to 5% by weight of polypentenamer. Mixtures of 50 to 95% by weight of polyisoprene and 5 to 50% by weight of polypentenamer are preferred.

These mixtures have excellent building tack and green strength. They are homogeneous and they can readily be covulcanised. Thus they are most suitably rubbers for producing automobile tires and other technical articles of manufacture.

In the following examples, parts are parts by weight and percent are percent by weight unless otherwise indicated.

EXAMPLE 1

Mixtures having the formulations indicated below were prepared on a roller mill, from a polyisoprene having a Mooney viscosity of 90 and containing more than 98% of cis-1,4-bonds and a polypentenamer containing 86% of trans-double bonds and having a Mooney viscosity ML–4′ (100° C.) of approximately 110:

Formulation I:                                          Parts
   Polyisoprene _____ [a] 100 to 50
   Polypentenamer _____ [a] 0 to 50
   Carbon black N–550 (fast extruding furnace) __ 30
   Zinc oxide _____ 3
   N-phenyl-N′-isopropyl-p-phenylenediamine ____ 2
   Stearic acid _____ 1
Formulation II:
   Polyisoprene _____ [a] 100 to 50
   Polypentenamer _____ [a] 0 to 50
   Carbon black N–550 (fast extruding furnace) __ 75
   Aromatic rubber extender oil _____ 40
   Zinc oxide _____ 2
   Stearic acid _____ 1
   N-phenyl-N′-i-propyl-p-phenylenediamine _____ 2

[a] Total 100 parts.

Strips measuring 6.2 mm. in width, 50 mm. in length and 1.5 mm. thickness are prepared from the mixtures and placed on a fabric which has been treated to give it a good affinity with rubber, and the strips are then covered with an aluminium foil and pressed for 3 minutes at 110° C. A completely smooth surface is obtained.

After removal of the foil, two such strips are pressed together over a contact surface of 38.44 mm.$^2$ and kept under a pressure of 2.25 kg./cm.$^2$ (=loaded with a weight of 16 ounces) for 10 seconds. A pull is then exerted on the contact area to pull the strips apart at the rate of 0.46 mm./sec. The force in grams counteracting the pull is known as the "bond strength."

The green strength is expressed as the tensile strength of the crude mixture in kg./cm.$^2$ according to DIN 53504.

TABLE I

| | | | | | | | |
|---|---|---|---|---|---|---|---|
| Cis-1,4-polyisoprene | 100 | | 90 | 80 | 70 | 60 | 50 |
| Trans-1,5-polypentenamer | | 100 | 10 | 20 | 30 | 40 | 50 |
| Bond strength (g): | | | | | | | |
| Formulation I | 850 | 2,260 | 1,310 | 1,680 | 1,810 | 2,020 | 2,010 |
| Formulation II | 670 | 2,040 | 990 | 1,200 | 1,400 | 1,510 | 1,620 |
| Green strength (kg./cm.$^2$): | | | | | | | |
| Formulation I | 8 | 28 | 13.2 | 16.8 | 18.9 | 20.2 | 22.0 |
| Formulation II | 6 | 22 | 10.1 | 13.2 | 14.0 | 15.1 | 16.3 |

The ageing stability was tested on vulcanisates prepared from the following formulation:

Formulation III: Parts
Polyisoprene _____ a 100 to 50
Polypentenamer _____ a 0 to 50
Carbon black N–550 (fast extruding furnace) ___ 75
Aromatic rubber extender oil _____ 40
Zinc oxide _____ 2
Stearic acid _____ 1
N-phenyl-N'-i-propyl-p-phenylenediamine _____ 1
Phenyl-α-naphthylamine _____ 1
Sulphur _____ 1.8
Benzothiazyl-2-cyclohexyl-sulphenamide _____ 0.5 a Total 100 parts.

The rubber mixtures were vulcanised in a press by heating 150° for 30 minutes.

The ageing stability was tested by treating vulcanisate samples with hot air at 100° C. in an oven according to DIN 53 508. The test samples were standard test rods according to DIN 53 504. The properties determined before and after hot air treatment for the specified forms were the tensile strength, elongation at break and modulus at 300% elongation according to DIN 53 504.

| | | | | | | | |
|---|---|---|---|---|---|---|---|
| Cis-1,4-polyisoprene | 100 | | 90 | 80 | 70 | 60 | 50 |
| Trans-1,5-polypentenamer | | 100 | 10 | 20 | 30 | 40 | 50 |
| Before ageing: | | | | | | | |
| Tensile strength (kg./cm.$^2$) | 208 | 205 | 207 | 206 | 210 | 201 | 208 |
| Elongation (percent) | 460 | 490 | 470 | 510 | 505 | 490 | 510 |
| Modulus 300% (kg./cm.$^2$) | 97 | 103 | 101 | 104 | 102 | 105 | 104 |
| Ageing for 7 days at 100° C. hot air: | | | | | | | |
| Tensile strength (kg./cm.$^2$) | 138 | 210 | 170 | 185 | 193 | 200 | 201 |
| Elongation (percent) | 250 | 515 | 420 | 435 | 450 | 505 | 490 |
| Modulus 300%)kg./cm.$^2$) | 115 | 135 | 135 | 129 | 112 | 114 | |
| Ageing for 14 days, 100° C. hot air: | | | | | | | |
| Tensile strength (kg./cm.$^2$) | 59 | 212 | 101 | 122 | 138 | 152 | 164 |
| Elongation (percent) | 210 | 465 | 330 | 390 | 425 | 460 | 480 |
| Modulus 300% (kg./cm.$^2$) | 00 | 137 | 148 | 143 | 139 | 135 | 119 |
| Ageing for 21 days, 100° C. hot air: | | | | | | | |
| Tensile strength (kg./cm.$^2$) | | 208 | 89 | 102 | 124 | 156 | 162 |
| Elongation (percent) | | 425 | 270 | 325 | 370 | 405 | 450 |
| Modulus 300% (kg./cm.$^2$) | | 145 | | 132 | 127 | 133 | 123 |

The ozone stability was tested on vulcanisates of the following rubber mixtures:

Formulation IV: Parts
Polyisoprene _____ a 100 to 50
Polypentenamer _____ a 0 to 50
Carbon black N–550 (fast extruding furnace) ___ 75
Aromatic rubber extender oil _____ 40
Zinc oxide _____ 2
Stearic acid _____ 1
N-phenyl-N'-i-propyl-p-phenylenediamine _____ 1.5
Microcrystalline antiozone wax _____ 1
Sulphur _____ 2
Benzothiazyl-2-cyclohexyl-sulphenamide _____ 0.5 a Total 100 parts.

The ozone stability of these mixtures was tested by a method of Farbenfabriken Bayer AG which is similar to DIN 53 509:

The stability to 50 p.p.h.m. of ozone at a temperature of 40±1° C. for up to 7 days was determined. It was assessed by recording the number of hours before cracking begins at various degrees of elongation.

| | | | | | | | |
|---|---|---|---|---|---|---|---|
| Cis-1,4-polyisoprene | 100 | | 90 | 80 | 70 | 60 | 50 |
| Trans-1,5-polypentenamer | | 100 | 10 | 20 | 30 | 40 | 50 |
| Beginning of cracking after (h.): | | | | | | | |
| At elongation of 10% | >168 | >168 | >168 | >168 | >168 | >168 | >168 |
| At elongation of 20% | 48 | >168 | 80 | 120 | 144 | 150 | >168 |
| At elongation of 30% | 24 | >168 | 55 | 80 | 120 | 144 | >168 |
| At elongation of 60% | 8 | >168 | 50 | 72 | 100 | 130 | 150 |

We claim:
1. A rubber mixture comprising
   (a) 5 to 95% by weight of polyisoprene rubber and
   (b) 95 to 5% by weight of trans-1,5-polypentenamer rubber.
2. A mixture as claimed in claim 1, which comprises
   (a) 50 to 95% of polyisoprene rubber and
   (b) 50 to 5% of trans-1,5-polypentenamer rubber.
3. A mixture as claimed in claim 1 in which the polyisoprene is a cis-1,4-polyisoprene.
4. A mixture as claimed in claim 3 in which the cis-1,4-polyisoprene has more than 70% of the double bonds in the cis-configuration.
5. A mixture as claimed in claim 1 in which the trans-1,5-polypentenamer has more than 30% of the double bonds in the trans-configuration.
6. Vulcanisates produced by vulcanising a mixture as claimed in claim 1.

References Cited
UNITED STATES PATENTS
3,337,520    8/1967    Bjornson et al. _____ 260—94.3

FOREIGN PATENTS
1,062,367    3/1967    Great Britain _____ 260—887

MURRAY TILLMAN, Primary Examiner

J. ZIEGLER, Assistant Examiner

U.S. Cl. X.R.

260—28.5 A, 33.6 AO